(12) United States Patent
Ji et al.

(10) Patent No.: US 12,545,200 B2
(45) Date of Patent: Feb. 10, 2026

(54) GROMMET FOR VEHICLE AND METHOD OF ASSEMBLING GROMMET ASSEMBLY FOR VEHICLE

(71) Applicants: HYUNDAI MOTOR COMPANY, Seoul (KR); KIA CORPORATION, Seoul (KR); YURA CORPORATION CO., LTD., Seongnam-si (KR)

(72) Inventors: Seonggoo Ji, Uijeongbu-si (KR); Han Sung Yoo, Seoul (KR); Jin Young Kim, Gunpo-si (KR)

(73) Assignees: HYUNDAI MOTOR COMPANY, Seoul (KR); KIA CORPORATION, Seoul (KR); YURA CORPORATION CO., LTD., Seoul (KR)

( * ) Notice: Subject to any disclaimer, the term of this patent is extended or adjusted under 35 U.S.C. 154(b) by 374 days.

(21) Appl. No.: 17/962,696

(22) Filed: Oct. 10, 2022

(65) Prior Publication Data

US 2023/0115622 A1 Apr. 13, 2023

(30) Foreign Application Priority Data

Oct. 13, 2021 (KR) .................. 10-2021-0135500

(51) Int. Cl.
- H02G 3/00 (2006.01)
- B60R 16/02 (2006.01)
- H02G 3/22 (2006.01)

(52) U.S. Cl.
CPC .......... B60R 16/0222 (2013.01); H02G 3/22 (2013.01)

(58) Field of Classification Search
CPC .... H01B 17/583; H01B 17/62; H01B 7/0045; B60R 16/0215; B60R 16/0207; H01R 43/20; H01R 13/5205; H02G 3/04; F16L 5/02; F16L 5/08; H05K 5/0247
See application file for complete search history.

(56) References Cited

U.S. PATENT DOCUMENTS

| | | | |
|---|---|---|---|
| 2002/0036098 A1* | 3/2002 | Okuhara | B60R 16/0222 174/152 G |
| 2009/0170360 A1* | 7/2009 | Shaw | H01R 9/0521 439/277 |

(Continued)

FOREIGN PATENT DOCUMENTS

KR 20210057617 A 5/2021

*Primary Examiner* — Timothy J Thompson
*Assistant Examiner* — Aditya Sharma
(74) *Attorney, Agent, or Firm* — MCDONNELL BOEHNEN HULBERT & BERGHOFF LLP

(57) ABSTRACT

A grommet for a vehicle includes a body mounted in a wiring hole of a vehicle panel through a mounting part provided on an outer circumference thereof, a first outer tube and a second outer tube formed to extend from opposite sides of the body in the direction of opposite surfaces of the panel, a partition wall extending between the first and second outer tubes from an inner circumference of the body, and an inner tube extending to the outside of the first outer tube by penetrate the inside of the first outer tube from the partition wall in order to support a wire passing through the wiring hole, wherein the inner tube includes a first section provided to be rolled and entered in the direction of the second outer tube, and the first section includes a first entry section capable of entering the inside of the second outer tube.

10 Claims, 14 Drawing Sheets

(56) References Cited

U.S. PATENT DOCUMENTS

| | | | | |
|---|---|---|---|---|
| 2013/0008693 A1* | 1/2013 | Okuhara | ............... | F16L 5/10 |
| | | | | 174/152 G |
| 2017/0349123 A1* | 12/2017 | Katoh | ............... | H01B 17/583 |
| 2023/0093525 A1* | 3/2023 | Oota | ............... | H01B 17/583 |
| | | | | 174/668 |

* cited by examiner

GROMMET FOR VEHICLE AND METHOD OF ASSEMBLING GROMMET ASSEMBLY FOR VEHICLE

CROSS REFERENCE TO RELATED APPLICATIONS

This application is based on and claims priority under 35 U.S.C. § 119 to Korean Patent Application No. 10-2021-0135500, filed on Oct. 13, 2021, in the Korean Intellectual Property Office, the disclosure of which is incorporated by reference herein in its entirety.

BACKGROUND

1. Field

The disclosure relates to a grommet for a vehicle used when a wire of the vehicle is wired, and a method of assembling a grommet assembly for a vehicle.

2. Description of the Related Art

A grommet is used in a vehicle to protect a wire routed through a panel.

The grommet for a vehicle is installed in the wiring hole formed in the panel, and the wire is routed to pass through a wiring hole through the inside of the grommet.

In general, a grommet for a vehicle is made of a material having elasticity, such as rubber, in consideration of sound insulation and sealing performance.

Therefore, the grommet for a vehicle suppresses noise or foreign substances from flowing through the wiring hole of the panel.

However, because there is still a limit to effectively sealing a gap between a grommet, which is hollow inside, and a wire, a leak problem due to the grommet in still occurring in a vehicle.

In order to solve this problem, the sealing performance of the grommet may be increased by using a separate sealing pad or the like, but this is not preferable in terms of cost or productivity of a vehicle.

SUMMARY

It is an aspect of the disclosure to provide a grommet for a vehicle capable of more effectively improving waterproofness depending on wiring of a wire, and a method of assembling a grommet assembly for a vehicle.

Additional aspects of the disclosure will be set forth in part in the description which follows and, in part, will be obvious from the description, or may be learned by practice of the disclosure.

In accordance with an aspect of the disclosure, a grommet for a vehicle includes a body mounted in a wiring hole of a vehicle panel through a mounting part provided on an outer circumference thereof, a first outer tube and a second outer tube formed to extend from opposite sides of the body in the direction of opposite surfaces of the panel, a partition wall extending between the first and second outer tubes from an inner circumference of the body, and an inner tube extending to the outside of the first outer tube by penetrate the inside of the first outer tube from the partition wall in order to support a wire passing through the wiring hole, wherein the inner tube includes a first section provided to be rolled and entered in the direction of the second outer tube, and the first section includes a first entry section capable of entering the inside of the second outer tube.

At least a portion of the first entry section may be positioned outside the first outer tube.

A locking protrusion may be provided on an outer circumference of an end of the inner tube in an extending direction of the inner tube, and the locking protrusion may be provided such that the first entry section is caught on the first outer tube at a time point when the entry of the first entry section into the inside of the second outer tube is completed.

The inner tube may include a folding induction groove for inducing a folding operation of the first section so that the first section is rolled in the direction of the second outer tube.

The folding induction groove may be provided on an outer circumference of the inner tube between the partition wall and the first section.

The second outer tube may be divided into a plurality of parts along a circumferential direction by including cutout portions formed along an axial direction on a circumference thereof.

A length of the inner tube may be provided to be longer than the sum of lengths of the body, the first outer tube, and the second outer tube.

A length of the inner tube may be provided to be longer than the sum of twice lengths of the body, the first outer tube, and the second outer tube.

The first entry section may include an inversion section entering the second outer tube in a state in which inner and outer circumferences are inverted to face the inner circumference of the second outer tube, and a non-inversion section entering the second outer tube without inversion of the inner and outer circumferences to overlap the inside of the first entry section, and a first concave-convex portion in the form of a serration may be provided on the inner circumference of at least a portion of the non-inversion section.

The inner tube may further include a second section connected to the first section, the second section may include a second entry section entering the first outer tube in a state in which the first entry section enters the second outer tube, and a second concave-convex portion in the form of a serration may be provided on the inner circumference of at least a portion of the second entry section.

In accordance with another aspect of the disclosure, a grommet for a vehicle includes a body mounted in a wiring hole of a vehicle panel through an outer circumference thereof, a pair of outer tubes formed to extend from opposite sides of the body in the direction of opposite surfaces of the panel, a partition wall extending between the pair of outer tubes from an inner circumference of the body, and an inner tube extending to penetrate the inside of one side of the outer tubes from the partition wall in order to support a wire passing through the wiring hole, wherein the inner tube has elasticity such that at least a partial section thereof is rolled and entered into the inside of the other side of the outer tubes, and a length of the inner tube is provided to be longer than the sum of lengths of the body and the one side of the outer tubes in an axial direction.

In accordance with another aspect of the disclosure, a grommet for a vehicle includes a body mounted in a wiring hole of a vehicle panel through an outer circumference thereof, a first outer tube and a second outer tube formed to extend from opposite sides of the body in the direction of opposite surfaces of the panel, a partition wall extending between the first and second outer tubes from an inner circumference of the body, and an inner tube extending to penetrate the inside of one side of the outer tubes from the partition wall in order to support a wire passing through the wiring hole, wherein the inner tube includes a first entry section capable of entering the inside of the second outer tube, and at least a portion of the first entry section is positioned outside the first outer tube.

In accordance with another aspect of the disclosure, a method of assembling a grommet assembly for a vehicle including a grommet and a wire, wherein the grommet includes a body mounted in a wiring hole of a vehicle panel through an outer circumference thereof, a first outer tube and a second outer tube formed to extend from opposite sides of the body in the direction of opposite surfaces of the panel, a partition wall extending between the first and second outer tubes from an inner circumference of the body, and an inner tube extending to the outside of the first outer tube by penetrate the inside of the first outer tube from the partition wall, wherein the inner tube includes a first section including a first entry section capable of entering the inside of the second outer tube and at least a portion of which is positioned outside the first outer tube, and a second section including a second entry section capable of entering the inside of the first outer tube in a state in which the first entry section enters the second outer tube, and wherein the method includes fitting the wire to the grommet to pass through the inner tube, combining an outer surface of the inner tube extending to the outside of the first outer tube and a surface of the wire drawn out to the outside of the inner tube by taping, entering the first entry section into the inside of the second outer tube by pulling the wire extending to the outside of the second outer tube in a state of fixing the grommet so that the first section is rolled and entered in the direction of the second outer tube, taping an outer surface of the first outer tube and the surface of the wire drawn out to the outside of the first outer tube, and taping an outer surface of the second outer tube and the surface of the wire drawn out to the outside of the second outer tube.

The entering of the first entry section into the inside of the second outer tube may include fixing the grommet to a fixing hole of a fixing jig using the mounting part provided on the outer circumference of the body.

The mounting part may include a locking groove into which an inner circumference of the wiring hole is inserted to be caught thereon, the fixing jig may include a fixing panel having the fixing hole, the fixing panel may have a thickness corresponding to the vehicle panel, and the fixing hole may have a diameter corresponding to the wiring hole.

BRIEF DESCRIPTION OF THE FIGURES

These and/or other aspects of the disclosure will become apparent and more readily appreciated from the following description of the embodiments, taken in conjunction with the accompanying drawings of which:

FIG. 10 is an enlarged view of part B of FIG. 9.

DETAILED DESCRIPTION

Figure 1:
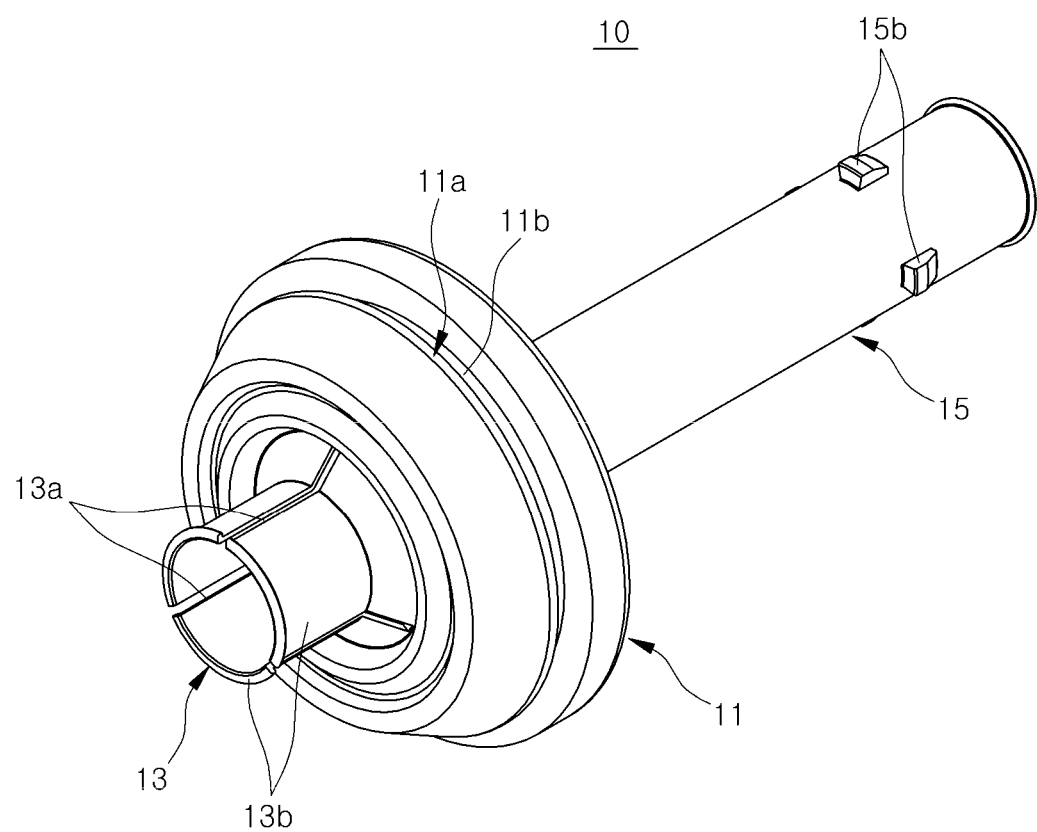
FIG. 1 is a perspective view of a grommet for a vehicle according to an embodiment of the disclosure.
Figure 2:
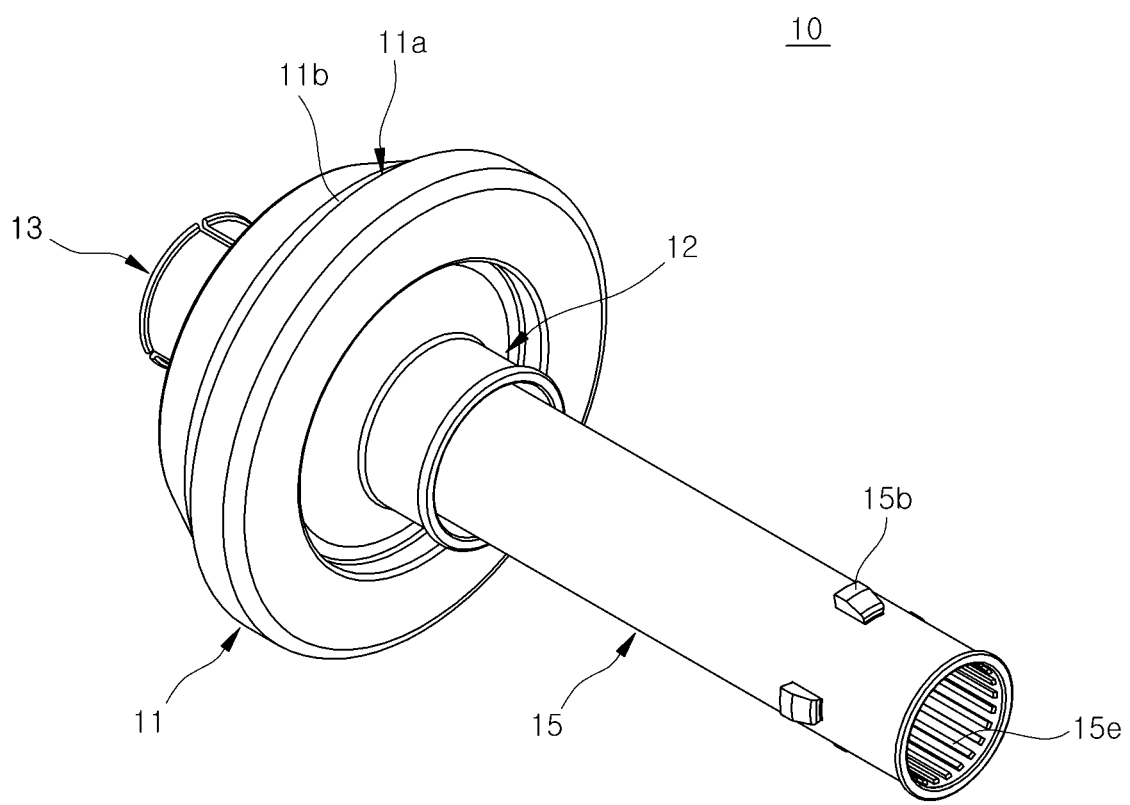
FIG. 2 is a perspective view of the grommet for a vehicle of FIG. 1 viewed from another direction.
Figure 3:
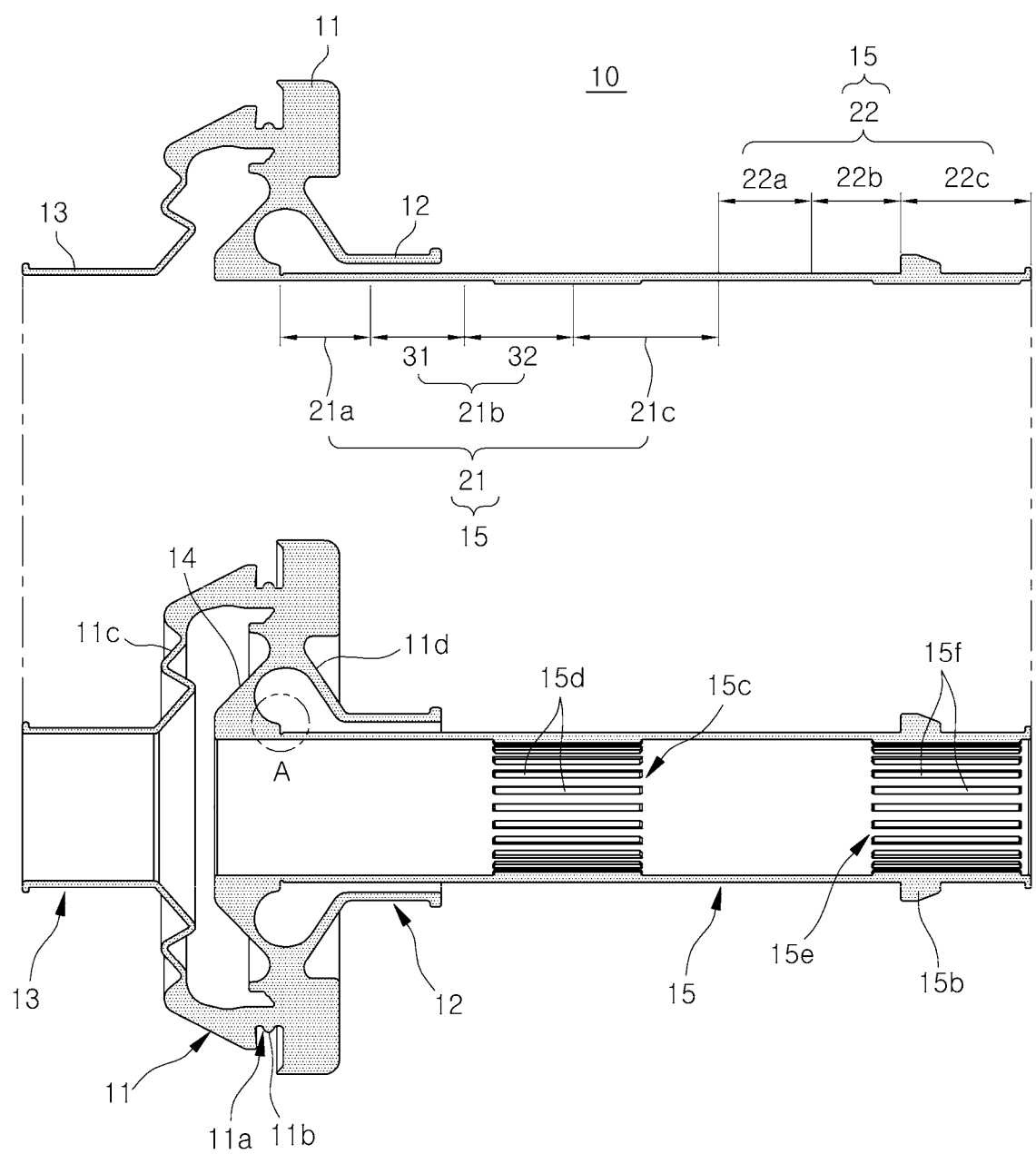
FIG. 3 is a cross-sectional view of the grommet for a vehicle according to an embodiment of the disclosure.
Figure 4:
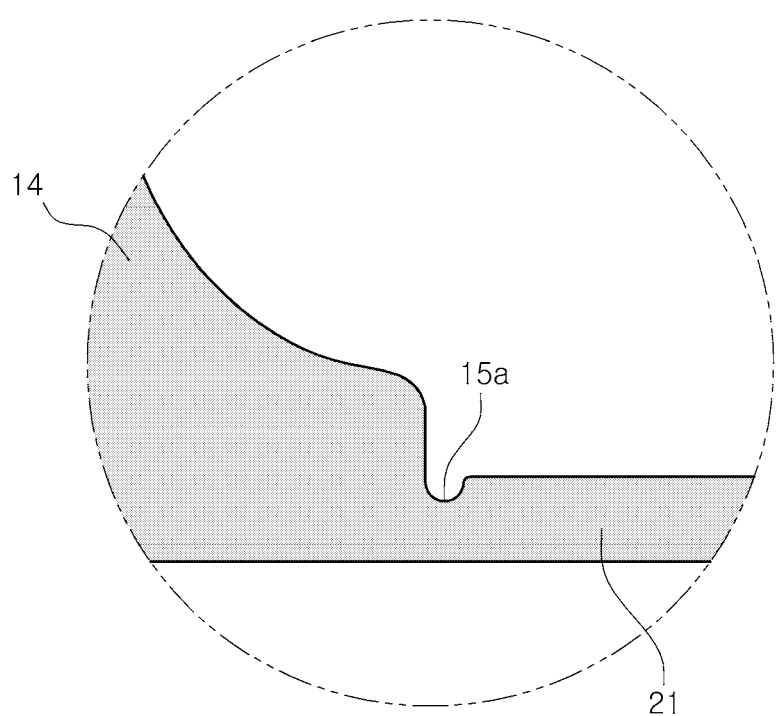
FIG. 4 is an enlarged view of part A of FIG. 3.
Figure 5:
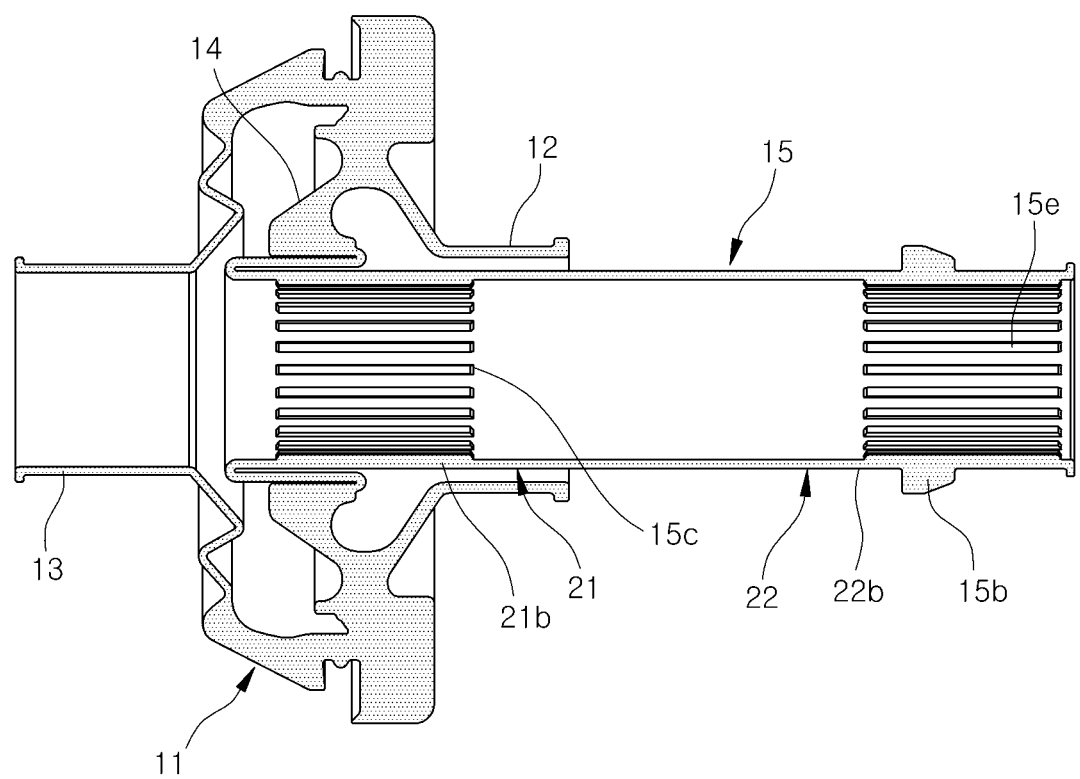
FIG. 5 is a cross-sectional view of the grommet for a vehicle according to an embodiment of the disclosure, which illustrates a state in which a first section of an inner tube entered in the direction of a second outer tube.
Figure 6:
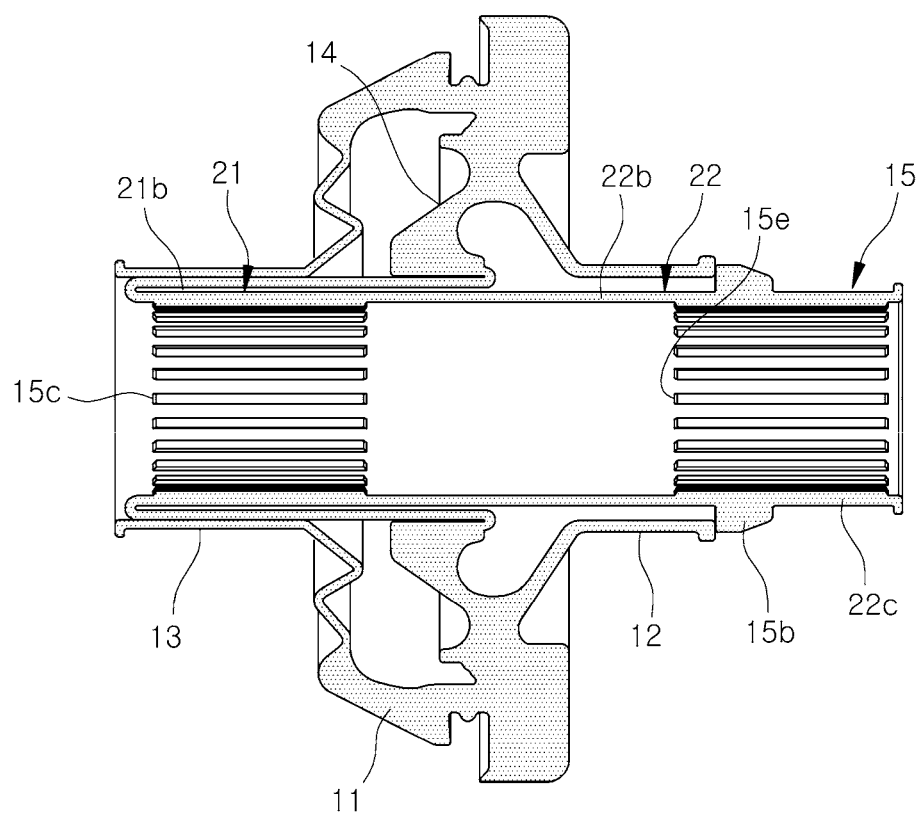
FIG. 6 illustrates a state in which a first entry section of the first section entered the inside of the second outer tube in the state of FIG. 5.

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, and may be embodied in other forms. In order to clearly explain the disclosure, parts not related to the description are omitted from the drawings, and the size of the components may be exaggerated for convenience.

As illustrated in FIGS. 1 to 6 and 14, a grommet for a vehicle 10 according to an embodiment of the disclosure includes a body 11 mounted on a wiring hole 2a of a vehicle panel 1 through a mounting part 11a provided on an outer circumference thereof, a first outer tube 12 and a second outer tube 13 formed to extend in the direction of opposite sides of the panel 1 from opposite sides of the body 11, a partition wall 14 extending between the first outer tube 12 and the second outer tube 13 from an inner circumference of the body 11, and an inner tube 15 extending from the partition wall 14 to the inside of the first outer tube 12 to support a wire 3 passing through the wiring hole 2a.

The panel 1 may include various panels inside the vehicle 10 through which the wire 3 is routed. For example, the panel 1 may be a dash panel 2 to partition an engine room of the vehicle 10 and an internal space of the vehicle 10. This embodiment will be described as an example that the panel 1 is provided as the dash panel 2.

The wire 3, which is provided to apply power or an electric signal, may be wired to penetrate the panel 1. The wire 3 may be wired to penetrate the dash panel 2 to electrically connect the components located in the engine room and the internal space. The wire 3 may include a plurality of wire strands and may be provided in the form of a harness.

The grommet for a vehicle 10 may be mounted in the wiring hole 2a through the body 11, and the wire 3 may pass through the wiring hole 2a through the inside of the grommet for a vehicle 10.

The grommet for a vehicle 10 may be made of a rubber material, and the body 11 may be provided in an annular shape.

The mounting part 11a may include a locking groove 11b provided such that an inner circumference of the wiring hole 2a is inserted therein and caught thereon, and the locking groove 11b may be provided along the outer circumference of the center of the body 11.

The body 11 may extend in the direction of opposite sides of the dash panel 2 in a form in which diameters of the opposite side thereof are reduced. The body 11 may include a wrinkled portion 11c formed to be wrinkled or a concave portion 11d formed to be concave.

The first outer tube 12 may extend in the direction of one surface of the panel 1 facing the engine room, and the second outer tube 13 may extend in the direction of the other surface of the panel 1 facing the internal space of the vehicle 10.

The partition wall 14 may extend between the first outer tube 12 and the second outer tube 13 from the inner circumference of the center of the body 11. The partition wall 14 may prevent noise or foreign substances from being introduced between outer circumferences of the first outer tube 12 and the second outer tube 13, and may support a first section 21 of the inner tube 15, which will be described later, through a distal end in the extending direction. The partition wall 14 may be provided such that a thickness of the distal end is thicker than a thickness of a start end in the extending direction so as to secure a supporting force for the first section 21.

The inner tube 15 made of a rubber material extends to the outside of the first outer tube 12 by penetrating the inside of the first outer tube 12, and may be rolled and entered in the direction of the second outer tube 13 by elasticity. The inner tube 15 may include the first section 21 provided to be rolled and entered in the direction of the second outer tube 12 along the extending direction, and a second section 22 connected to the first section 21.

The first section 21 may include a first entry section 21b capable of entering the inside of the second outer tube 13. The first entry section 21b may contribute to improving the sealing performance between the wire 3 and the grommet for a vehicle 10 in the direction of the internal space by doubly supporting the wire 3 together with the second outer tube 13 in a state of entering the inside of the second outer tube 13.

The first entry section 21b may support the second outer tube 13 in the state of entering the entire section or a partial section of the second outer tube 13.

Also, the inner tube 15 may contribute to the improvement of the sealing performance for the wire 3 positioned between the first outer tube 12 and the second outer tube 13 as the first entry section 21b connects between the first outer tube 12 and the second outer tube 13 in the state of entering the inside of the second outer tube 13.

The first section 21 may include an entry guide section 21a, the first entry section 21b, and a first connection section 21c along the extending direction of the inner tube 15.

The entry guide section 21a may guide the entry operation of the first entry section 21b entering the inside of the second outer tube 13, and the first connection section 21c may connect the first section 21 to the second section 22.

The inner tube 15 may include a folding induction groove 15a for inducing a folding operation of the first section 21 so that the first section 21 may be smoothly rolled in the direction of the second outer tube 12, and the folding induction groove 15a may be provided along an outer circumference of the inner tube 15 between the partition wall 14 and the first section 21.

In order for the first entry section 21b to smoothly enter the inside of the second outer tube 13, the second outer tube 13 may be divided into a plurality of parts 13b along a circumferential direction by including cutout portions 13a formed along an axial direction on the circumference thereof.

The three cutout portions 13a are provided along the circumference of the second outer tube 13 so that the second outer tube 13 may be divided into the three parts 13b along the circumferential direction.

As the cutout portions 13a between the divided parts 13b are widened in a process in which the first entry section 21b enters the inside of the second outer tube 13, the first entry section 21b may smoothly enter the inside of the second outer tube 13. The cutout portions 13a may be formed to slightly extend toward the body 11.

The second section 22 may include a second connection section 22a, a second entry section 22b, and a distal end section 22c along the extending direction of the inner tube 15. The second connection section 22a may be connected to the first connection section 21c to connect the second section 22 to the first section 21, and the second entry section 22b may be provided to enter the inside of the first outer tube 12 in the state in which the first entry section 21b enters the inside of the second outer tube 13.

The second entry section 22b may contribute to improving the sealing performance between the wire 3 and the grommet for a vehicle 10 in the direction of the engine room by doubly supporting the wire 3 together with the first outer tube 12 in a state of entering the inside of the first outer tube 12.

The distal end section 22c may form the distal end of the inner tube 15 in the extending direction of the inner tube 15, and may be positioned outside the first outer tube 12 in the state in which the first entry section 21b enters the second outer tube 13.

Therefore, the inner tube 15 may be positioned inside over the entire section between both sides of the outer tubes 12 and 13 in the state in which the first entry section 21b enters the second outer tube 13.

Taking this into account, a length of the inner tube 15 may be preferably provided longer than the sum of lengths of the body 11, the first outer tube 12, and the second outer tube 13, and may be more preferably provided longer than the sum of the length of the body 11, the length of the first outer tube 12, and the twice length of the second outer tube 13 in consideration of an overlapping structure of the first entry section 21b.

A locking protrusion 15b may be provided on an outer circumference of the distal end section 22c, and the locking protrusion 15b may be provided such that the first entry section 21b is caught on the first outer tube 12 at a time point when the entry of the first entry section 21b into the inside of the second outer tube 13 is completed.

According to such a locking structure between the locking protrusion 15b and the first outer tube 12, an entry length of the inner tube 15 entering in the direction of the second outer tube 13 may be limited so that the first entry section 21b and the second entry section 22b may be positioned in correct positions on the inside of the second outer tube 13 and the first outer tube 12, respectively.

A plurality of the locking protrusions 15b may be disposed to be spaced apart from each other along the circumferential direction on the outer circumference of the distal end section 22c so that the circumference of the distal end section 22c is stably caught on an end of the first outer tube 12.

Unlike this embodiment, the locking protrusion 15b may be implemented in a continuous ring shape along the outer circumference of the distal end section 22c.

The first entry section 21b may include an inversion section 31 entering the second outer tube 13 in a state in which inner and outer circumferences are inverted to face the inner circumference of the second outer tube 13, and a non-inversion section 32 entering the second outer tube 13 without inversion of the inner and outer circumferences to overlap the inside of the inversion section 31. Accordingly, the first entry section 21b may support a circumference of the wire 3 in a state of having a doubly overlapping structure by itself.

A first concave-convex portion 15c in the form of a serration may be provided on the inner circumference of at least a portion of the non-inversion section 32 to reduce a gap between the circumference of the wire 3 and the non-inversion section 32. Therefore, the performance of close contact between the non-inversion section 32 of the grommet for a vehicle 10 and the wire 3 may be further improved, and this may contribute to further improving the sealing performance between the wire 3 drawn out toward the internal space and the grommet for a vehicle 10.

The first concave-convex portion 15c may be provided such that protrusions 15d formed along the axial direction are spaced apart from each other along the inner circumference of the non-inversion section 32. The first concave-convex portion 15c may be provided over the entire section of the non-inversion section 32, and may further extend toward the first connection section 21c.

A second concave-convex portion 15e in the form of a serration may be provided on an inner circumference of at least a portion of the second entry section 22b to reduce a gap between the circumference of the wire 3 and the second entry-section 22b.

Therefore, as the performance of close contact between the second entry section 22b of the grommet for a vehicle 10 and the wire 3 is improved, the sealing performance between the wire 3 drawn out toward the engine room and the grommet for a vehicle 10 may also be further improved.

The second concave-convex portion 15e may be formed through a plurality of protrusions 15f in the same shape as the first concave-convex portion 15c. Unlike the drawing, the second concave-convex portion 15e may be provided over the entire section of the second entry section 22b, and may further extend toward the distal end section 22c.

The first entry section 21b may be provided such that at least a portion thereof is positioned outside the first outer tube 12. Accordingly, the entire outer surface of the section extending to the outside of the first outer tube 12 together with a portion of the first entry section 21b in the inner tube 15 may be sealed through a tape 41, and this may be effectively used to improve the sealing performance of the grommet for a vehicle 10 by taping. A detailed description thereof will be provided later.

The grommet for a vehicle 10 configured as described above may be assembled with the wire 3 to form a grommet assembly for a vehicle 30.

Hereinafter, a method of assembling the grommet assembly for a vehicle 30 according to an embodiment will be described.

FIGS. 7 to 13 sequentially illustrate a method of assembling the grommet assembly for a vehicle 30 according to an embodiment.

Figure 7:
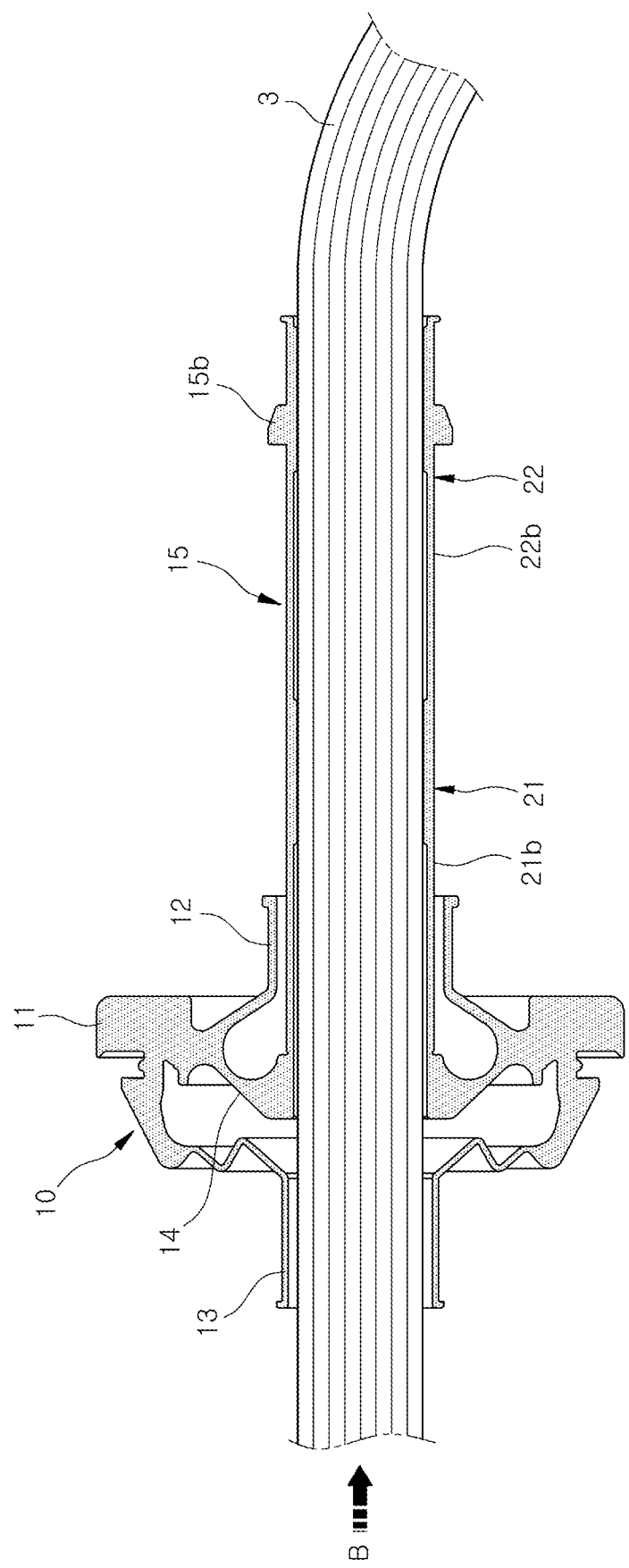
FIGS. 7, 8, 9, 10, 11, 12, and 13 sequentially illustrate a method of assembling a grommet assembly for a vehicle according to an embodiment of the disclosure.

First, in order to assemble the grommet for a vehicle 10 and the wire 3, as illustrated in FIG. 7, the wire 3 may be fitted to the grommet for a vehicle 10 so as to penetrate the inner tube 15.

In this case, the wire 3 is fitted to the grommet for a vehicle 10 in the direction of the first outer tube 12 (the direction of arrow B) from the second outer tube 13 side, so that the first section 21 of the inner tube 15 may be prevented from moving in the direction of the second outer tube 13 by the wire 3 fitted to the inner tube 15.

Figure 8:
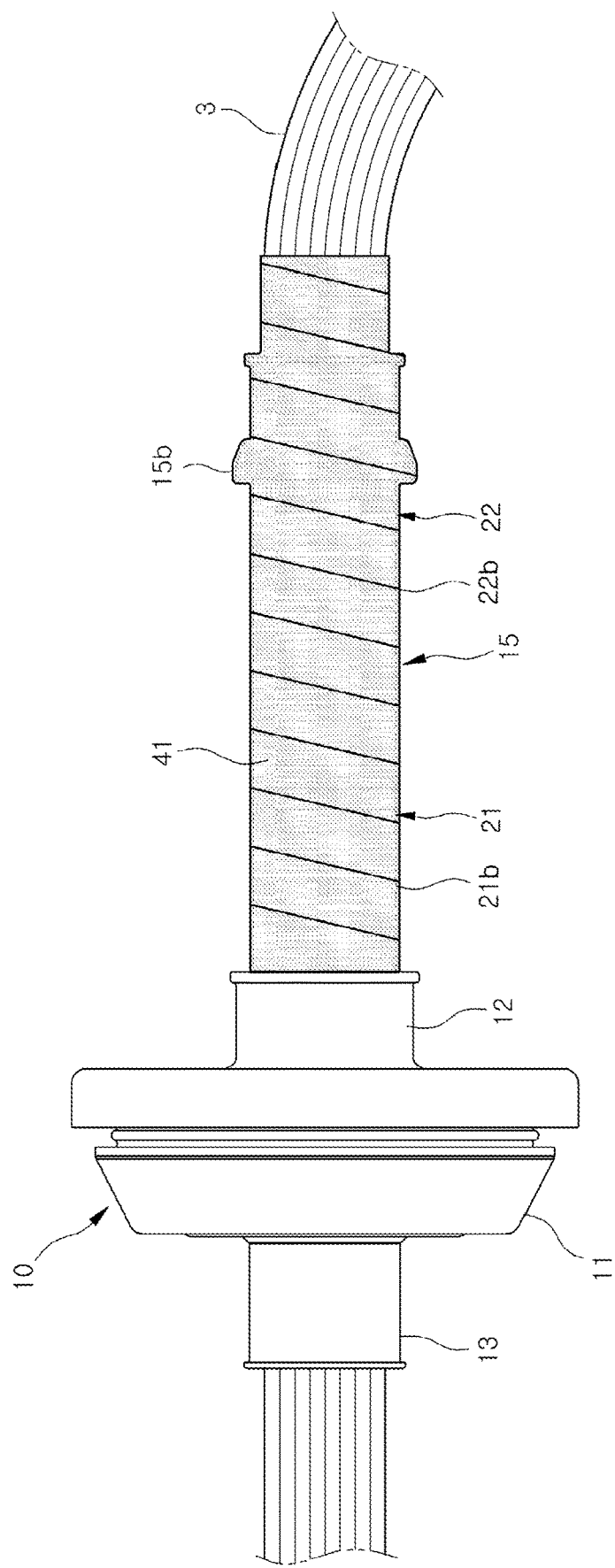
Figure 9:
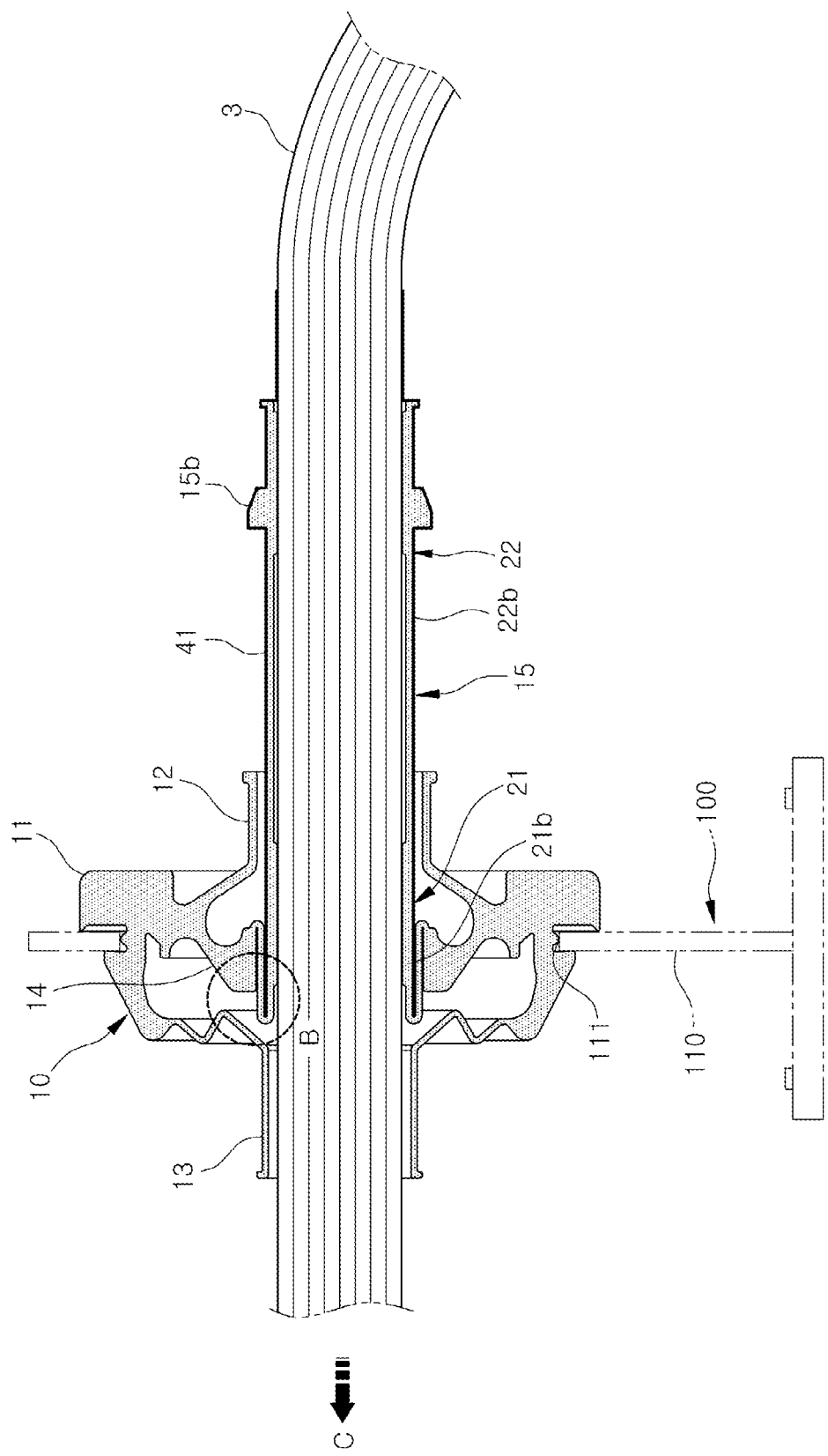
Figure 10:
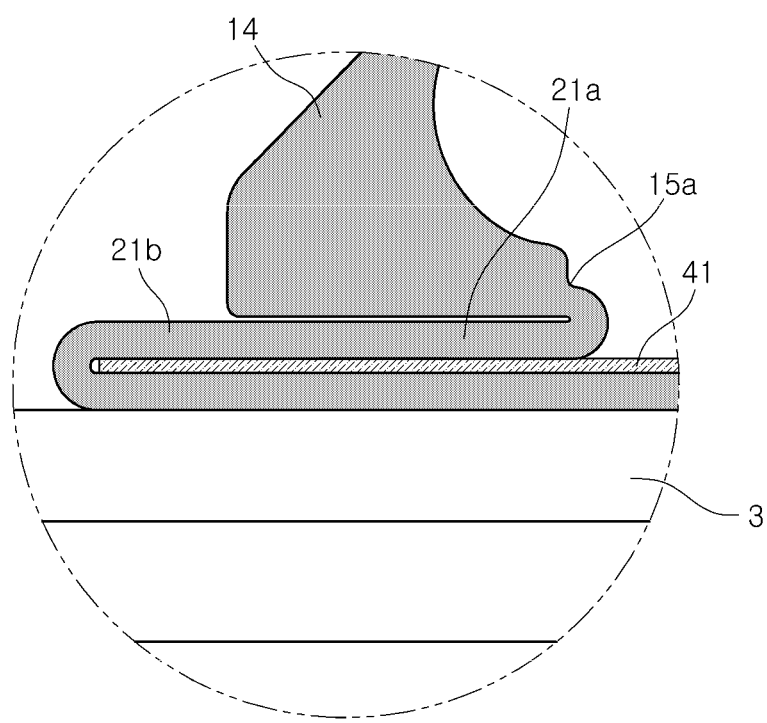
Figure 11:
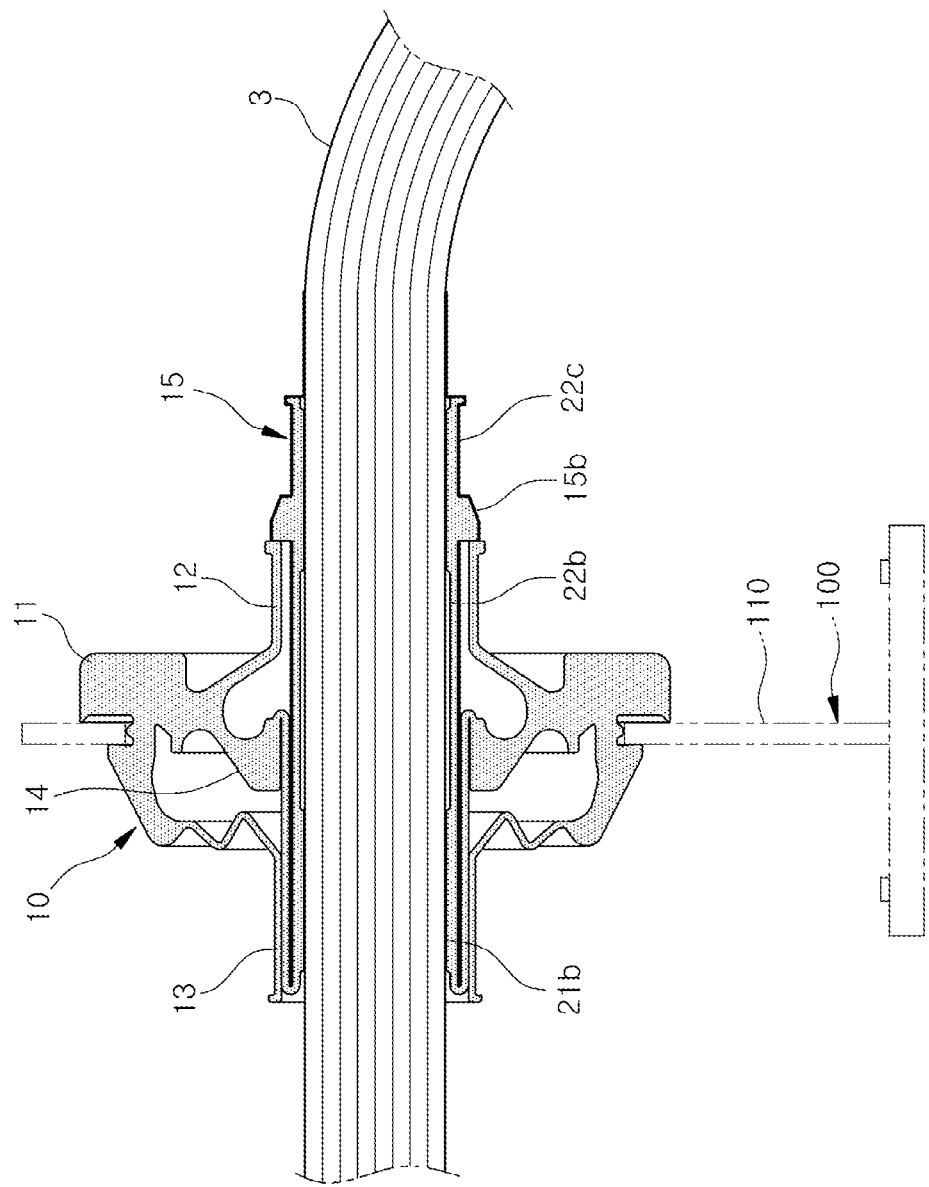

Next, as illustrated in FIG. 8, an outer surface of the inner tube 15 extending to the outside of the first outer tube 12 and a surface of the wire 3 drawn out to the outside of the inner tube 15 may be combined by taping.

In taping, the tape 41 of a waterproof material may be used in consideration of waterproofness. In this case, the tape 41 seals the outer surface of the inner tube 15 positioned outside the first outer tube 12 together with at least a portion of the first entry section 21b and seals an outer surface of the wire 3 extending outside the inner tube 15, so that a gap between wire 3 and inner tube 15 may be closed.

In this state, as illustrated in FIGS. 9 to 13, the wire 3 extending to the outside of the second outer tube 13 may be pulled so that the first entry section 21b enters the second outer tube 13 in a state in which the grommet for a vehicle 10 is fixed. Arrow C in FIG. 9 indicates a pulling direction of the wire 3.

Therefore, as the inner tube 15 combined with the wire 3 moves in the direction of the second outer section 13, the first section 21 is drawn by the wire 3 and gradually rolled and entered in the direction of the second outer tube 13.

At this time, the grommet for a vehicle 10 may be fixed to a fixing jig 100 through the mounting part 11a provided on the body 11 to allow the first entry section 21b to smoothly enter the second outer tube 13 during a pulling operation of the wire 3.

The fixing jig 100 may be fixed to a workplace by including a fixing panel 110 having a fixing hole 111. The fixing panel 110 has a thickness corresponding to the dash panel 2 so that the body 11 of the grommet for a vehicle 10 may be fixed to the fixing panel 110 using the locking groove 11b forming the mounting part 11a, and the fixing hole 111 may be provided to have a diameter corresponding to the wiring hole 2a of the dash panel 2. Therefore, the grommet for a vehicle 10 may be stably fixed to the fixing jig 100 through the mounting part 11a provided on the body 11.

The operation of pulling the wire 3 may be completed as the first entry section 21b enters the inside of the second outer tube 13 and the locking protrusion 15b is caught on and supported by the end of the first outer tube 12.

Figure 12:
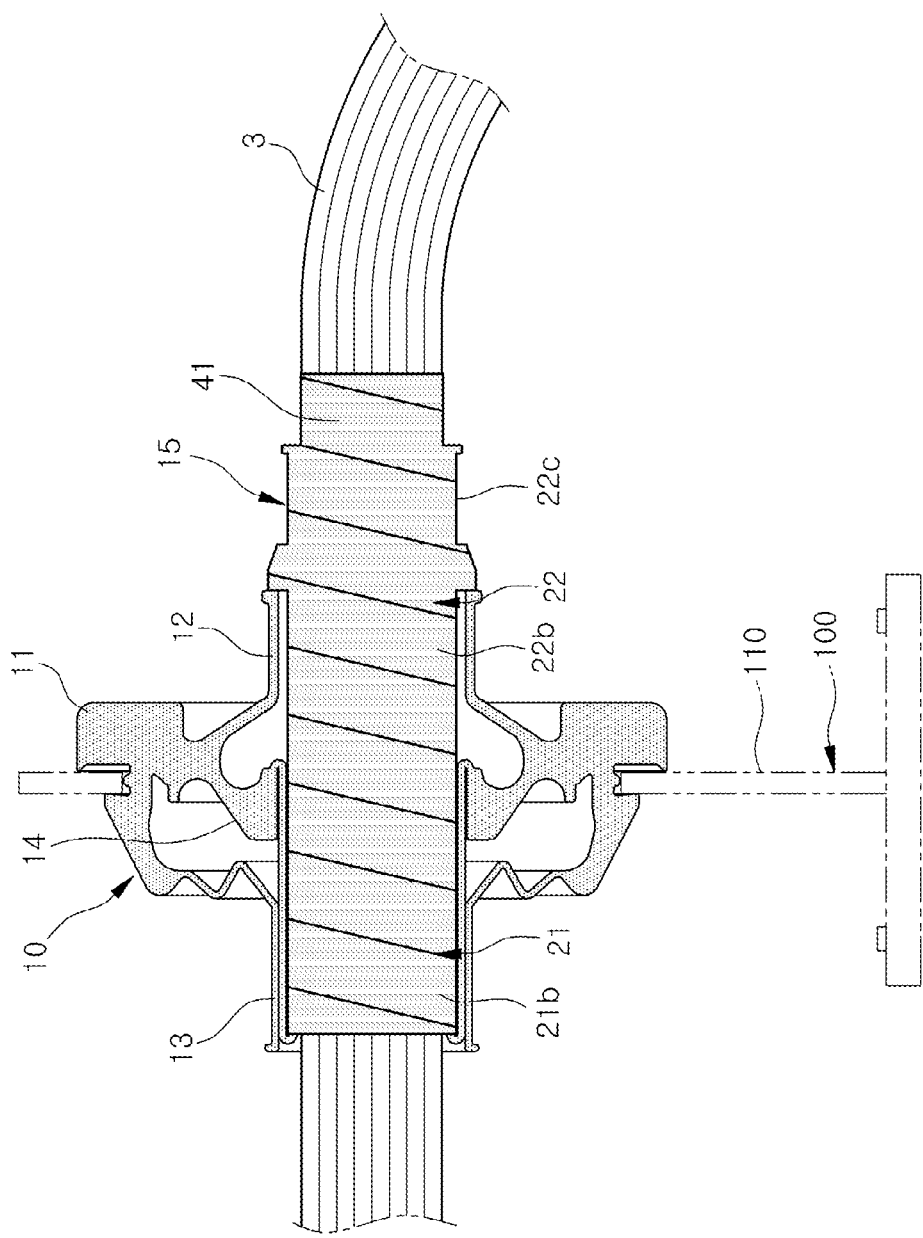

As illustrated in FIG. 12, at this time, as the first entry section 21b of the inner tube 15 enters the inside of the second outer tube 13 and the second entry section 22b enters the inside of the first outer tube 12, the wire 3 positioned inside the grommet for a vehicle 10 may be in a state in which the entire section thereof is sealed by the tape 41.

Figure 13:
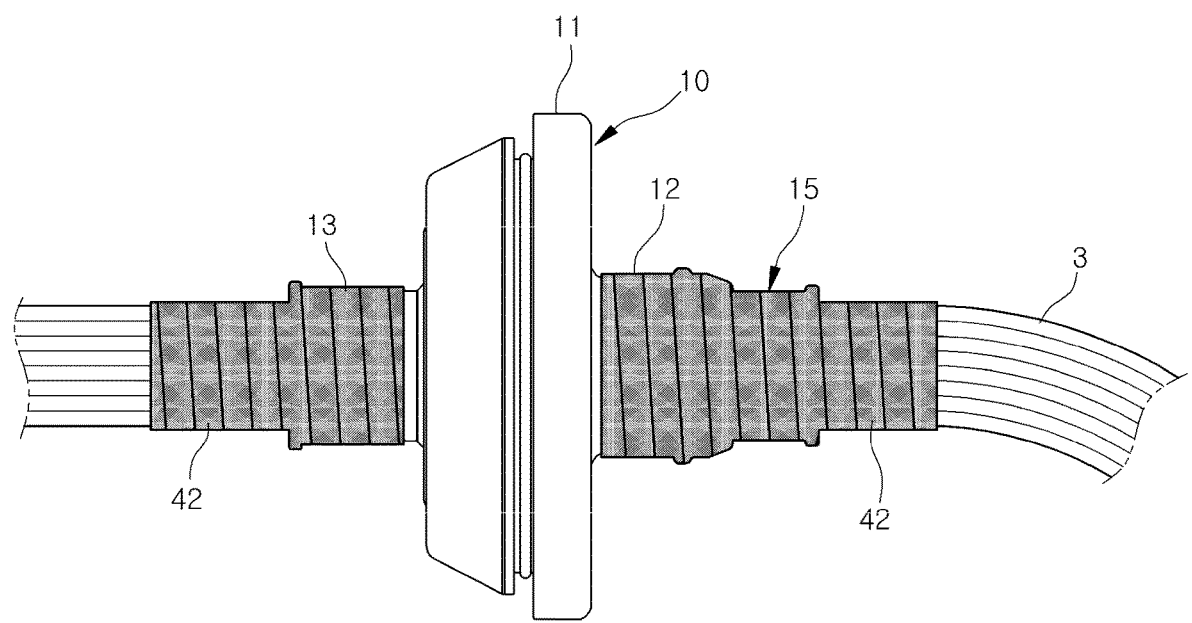

In this state, as illustrated in FIG. 13, the outer surface of the first outer tube 12 and the surface of the wire 3 drawn out to the outside of the first outer tube 12 may be taped and the outer surface of the second outer tube 13 and the surface of the wire 3 drawn out to the outside of the second outer tube 13 may be taped, and accordingly, the assembly of the grommet assembly for a vehicle 30 may be completed.

In this taping, a tape 42 of a waterproof material may be used in consideration of waterproofness. In this case, one side of the tape 42 seals a gap between the outer surface of the first outer tube 12 and the wire 3 extending to the outside thereof while tightening the circumference of the first outer tube 12, and the other side of the tape 42 may seal a gap between the outer surface of the second outer tube 13 and the wire 3 extending to the outside thereof while tightening the circumference of the second outer tube 13.

Figure 14:
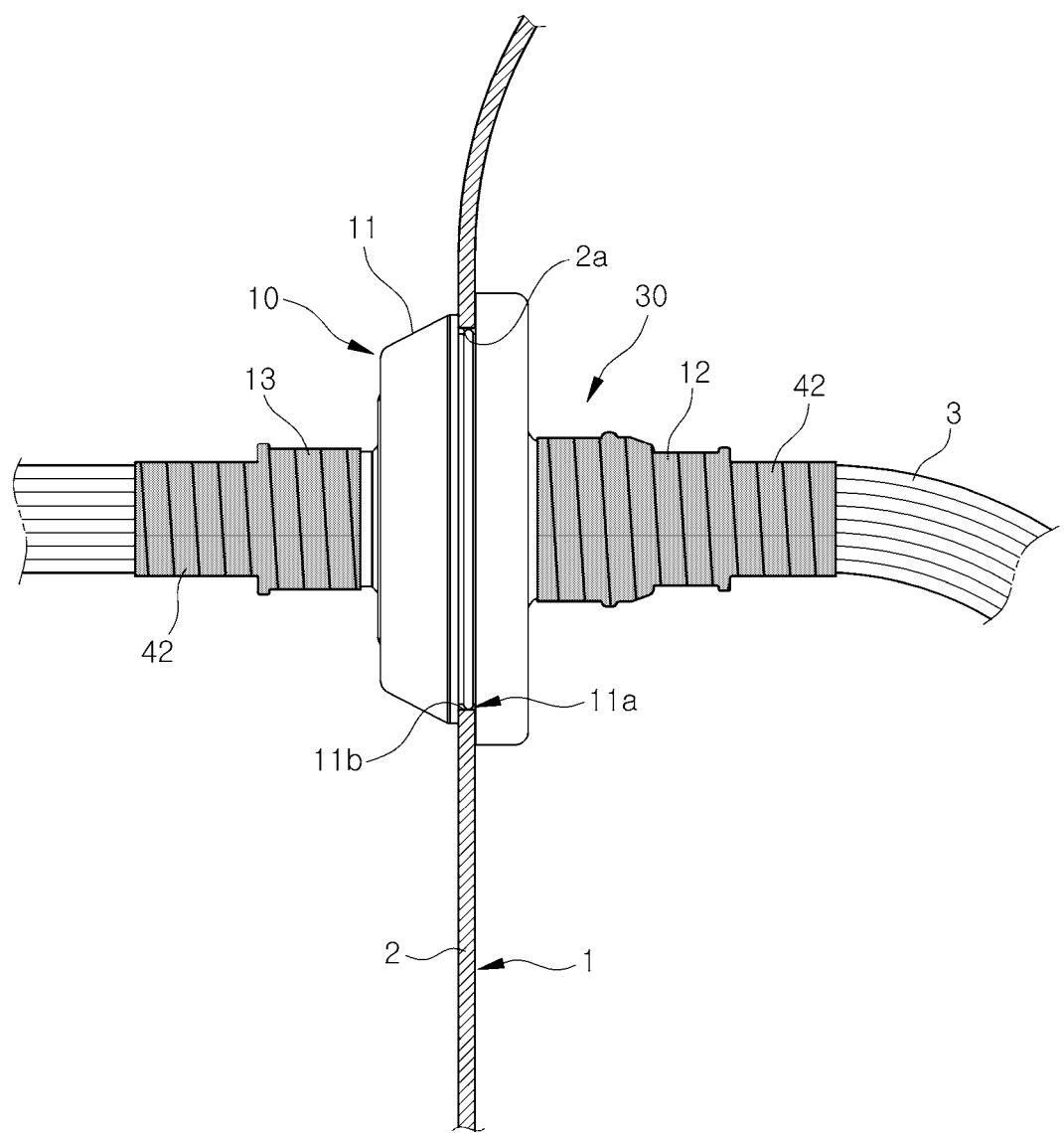
FIG. 14 illustrates a state in which the grommet assembly for a vehicle according to an embodiment of the disclosure is mounted on a dash panel of a vehicle.

As illustrated in FIG. 14, the grommet assembly for a vehicle 30 assembled as described above may be mounted on the dash panel 2 of the vehicle 10 so that the inner circumference of the wiring hole 2a is inserted into and caught on the locking groove 11b.

In this state, as the second outer tube 13 side supports the circumference of the wire 3 in multiples by the tape 42, the second outer tube 13, the first entry section 21b positioned inside of the second outer tube 13 in a state where the inversion section 31 and the non-inversion section 32 overlap, and the tape 41, the grommet assembly for a vehicle 30 may reliably ensure the sealing performance between the wire 3 and the grommet for a vehicle 10 in the direction of the internal space.

Also, as the first outer tube 12 side supports the circumference of the wire 3 in multiples by the tape 42, the first outer tube 12, the second entry section 22*b*, and the tape 41, the grommet assembly for a vehicle 30 may reliably ensure the sealing performance between the wire 3 and the grommet for a vehicle 10 in the direction of the engine room.

As is apparent from the above, according to a grommet for a vehicle and a method of assembling a grommet assembly for a vehicle according to an embodiment of the disclosure, because a gap between the grommet for a vehicle and a wire can be sealed in multiples without adding a separate component such as a sealing pad, waterproofness depending on the wiring of the wire can be improved more effectively.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A grommet for a vehicle comprising:
a body mounted in a wiring hole of a vehicle panel through a mounting part provided on an outer circumference of the vehicle panel;
a first outer tube extending from one side of the body from a first surface of the vehicle panel in a first direction;
a second outer tube extending from an opposite side of the body from a second, opposite surface of the vehicle panel in a second direction;
a partition wall extending between the first and second outer tubes from an inner circumference of the body; and
an inner tube extending to the outside of the first outer tube by penetrating the inside of the first outer tube from the partition wall to support a wire passing through the wiring hole;
wherein the inner tube includes a first section rolled and inserted in the direction of the second outer tube;
wherein the first section includes a first entry section configured to be inserted into the inside of the second outer tube;
wherein the first section is overlapped and located on the inside of the second outer tube; and
wherein the first entry section includes an inverted section in which inner and outer peripheries are inverted, and a non-inverted section in which inner and outer peripheries are not inverted and are overlapping each other.

2. The grommet according to claim 1, wherein at least a portion of the first entry section is positioned outside the first outer tube.

3. The grommet according to claim 1, wherein an outer circumference of an end of the inner tube comprises a locking protrusion extending outwardly from the inner tube, and the locking protrusion is provided such that the first entry section is caught on the first outer tube when the first entry section is completely inserted into the second outer tube.

4. A grommet for a vehicle comprising:
a body mounted in a wiring hole of a vehicle panel through a mounting part provided on an outer circumference of the vehicle panel;
a first outer tube extending from one side of the body from a first surface of the vehicle panel in a first direction;
a second outer tube extending from an opposite side of the body from a second, opposite surface of the vehicle panel in a second direction;
a partition wall extending between the first and second outer tubes from an inner circumference of the body; and
an inner tube extending to the outside of the first outer tube by penetrating the inside of the first outer tube from the partition wall to support a wire passing through the wiring hole;
wherein the inner tube includes a first section rolled and inserted in the direction of the second outer tube;
wherein the first section includes a first entry section configured to be inserted into the inside of the second outer tube; and
wherein the inner tube includes a folding induction groove configured to induce folding of the first section so that the first section is rolled in the direction of the second outer tube.

5. The grommet according to claim 4, wherein the folding induction groove is provided on an outer circumference of the inner tube between the partition wall and the first section.

6. The grommet according to claim 1, wherein the second outer tube is divided into a plurality of parts along a circumferential direction by including cutout portions formed along an axial direction on a circumference of the second outer tube.

7. The grommet according to claim 1, wherein a length of the inner tube is longer than a sum of lengths of the body, the first outer tube, and the second outer tube.

8. The grommet according to claim 1, wherein a length of the inner tube is longer than a sum of twice lengths of the body, the first outer tube, and the second outer tube.

9. A grommet for a vehicle comprising:
a body mounted in a wiring hole of a vehicle panel through a mounting part provided on an outer circumference of the vehicle panel;
a first outer tube extending from one side of the body from a first surface of the vehicle panel in a first direction;
a second outer tube extending from an opposite side of the body from a second, opposite surface of the vehicle panel in a second direction;
a partition wall extending between the first and second outer tubes from an inner circumference of the body; and
an inner tube extending to the outside of the first outer tube by penetrating the inside of the first outer tube from the partition wall to support a wire passing through the wiring hole;
wherein the inner tube includes a first section rolled and inserted in the direction of the second outer tube;
wherein the first section includes a first entry section configured to be inserted into the inside of the second outer tube; and
wherein the first entry section includes an inversion section entering the second outer tube when inner and outer circumferences are inverted to face the inner circumference of the second outer tube, and a non-inversion section entering the second outer tube without inversion of the inner and outer circumferences to overlap the inside of the first entry section, and a first concave-convex portion in the form of a serration is provided on the inner circumference of at least a portion of the non-inversion section.

10. The grommet according to claim 9, wherein the inner tube further includes a second section connected to the first section, the second section includes a second entry section entering the first outer tube when the first entry section enters the second outer tube, and a second concave-convex portion in the form of a serration is provided on the inner circumference of at least a portion of the second entry section.

\* \* \* \* \*